United States Patent
Nakamura et al.

(10) Patent No.: US 9,081,086 B2
(45) Date of Patent: Jul. 14, 2015

(54) VEHICLE DETECTION DEVICE AND VEHICLE DETECTION METHOD

(71) Applicant: NISSAN MOTOR CO., LTD., Kanagawa (JP)

(72) Inventors: Mitsunori Nakamura, Tokyo (JP); Hiroshi Satoh, Yokohama (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/380,011

(22) PCT Filed: Feb. 26, 2013

(86) PCT No.: PCT/JP2013/054911
§ 371 (c)(1),
(2) Date: Aug. 20, 2014

(87) PCT Pub. No.: WO2013/129380
PCT Pub. Date: Sep. 6, 2013

(65) Prior Publication Data
US 2015/0014533 A1  Jan. 15, 2015

(30) Foreign Application Priority Data
Mar. 1, 2012 (JP) ................................. 2012-045221

(51) Int. Cl.
| | |
|---|---|
| G01S 13/04 | (2006.01) |
| G01S 7/41 | (2006.01) |
| G01S 13/93 | (2006.01) |
| G08G 1/16 | (2006.01) |
| G06K 9/00 | (2006.01) |
| G01S 13/88 | (2006.01) |

(52) U.S. Cl.
CPC .............. *G01S 13/04* (2013.01); *G01S 7/411* (2013.01); *G01S 13/88* (2013.01); *G01S 13/931* (2013.01); *G06K 9/00805* (2013.01); *G06K 9/00825* (2013.01); *G08G 1/166* (2013.01)

(58) Field of Classification Search
CPC .................................. G01S 13/04; G01S 13/88
USPC ....................................................... 250/336.1
See application file for complete search history.

(56) References Cited

U.S. PATENT DOCUMENTS

| | | | | |
|---|---|---|---|---|
| 6,246,365 | B1 * | 6/2001 | Tokoro | 342/427 |
| 7,042,345 | B2 * | 5/2006 | Ellis | 340/436 |
| 7,688,258 | B2 * | 3/2010 | Aoki | 342/179 |

(Continued)

FOREIGN PATENT DOCUMENTS

| | | |
|---|---|---|
| JP | 2006-322833 A | 11/2006 |
| JP | 2007-235950 A | 9/2007 |
| JP | 2007-293627 A | 11/2007 |

*Primary Examiner* — Marcus Taningco
(74) *Attorney, Agent, or Firm* — Young Basile (57) ABSTRACT

A vehicle detection device includes: an antenna configured to sense electromagnetic waves; an image generation unit configured to generate a radio wave image; a road surface region detection unit configured to detect a road surface region in the radio wave image; a symmetry axis setting unit configured to set a first symmetry axis at a part of the boundary of the road surface region; a road surface reflection region setting unit configured to set a horizontal central line at a center of the radio wave image and set a road surface reflection region between the central line and the first symmetry axis; and a vehicle detection unit configured to compare the waveform of pixel outputs in the road surface reflection region with the waveform of pixel outputs in the road surface region and to detect the road surface reflection region as a vehicle.

10 Claims, 4 Drawing Sheets

(56) References Cited

U.S. PATENT DOCUMENTS

| | | |
|---|---|---|
| 7,756,298 B2 * | 7/2010 | Miyahara et al. ............. 382/104 |
| 2004/0003951 A1 * | 1/2004 | Kikuchi et al. ............... 180/169 |
| 2006/0276152 A1 | 12/2006 | Aoki |
| 2007/0248245 A1 | 10/2007 | Aimura et al. |
| 2010/0299063 A1 * | 11/2010 | Nakamura et al. ............ 701/208 |

* cited by examiner

VEHICLE DETECTION DEVICE AND VEHICLE DETECTION METHOD

CROSS REFERENCE TO RELATED APPLICATION

The present application claims priority to Japanese Patent Application No. 2012-045221, filed Mar. 1, 2012 and incorporated herein in its entirety.

TECHNICAL FIELD

The present invention relates to a vehicle detection device and a vehicle detection method to detect a vehicle on a road by receiving electromagnetic waves radiated from a object.

BACKGROUND

In recent years, some techniques have been developed to detect an object such as a vehicle by measuring radio waves radiated from the object. As an example thereof, Japanese Patent Application Publication No. 2006-322833 is disclosed. The radio wave receiving system disclosed in Japanese Patent Application Publication No. 2006-322833 detects a vehicle by detecting the profile of the windshield or hood of the vehicle from the received radio waves.

However, the above radio wave receiving system disclosed in Japanese Patent Application Publication No. 2006-322833 is configured to recognize a vehicle by detecting the profile of a part of the vehicle, and therefore has a problem that false detection may be caused due to the presence of another object having a similar profile.

SUMMARY

The present invention was proposed in the aforementioned circumstance, and an object of the present invention is to provide a vehicle detection device and a vehicle detection method which are capable of accurately detecting a vehicle by utilizing electromagnetic waves radiated from the object.

A vehicle detection device according to a first aspect of the present invention includes: an antenna configured to sense electromagnetic waves radiated from an object; an image generation unit configured to generate a radio wave image based on the electromagnetic waves received by the antenna; a road surface region detection unit configured to detect a road surface region from the radio wave image based on the electromagnetic waves received by the antenna; a symmetry axis setting unit configured to set a first symmetry axis at a part of a boundary of the road surface region, the part having a horizontal length not less than a predetermined value; a road surface reflection region setting unit configured to set a horizontal central line at a center of the radio wave image in a vertical direction and set a road surface reflection region between the central line and the first symmetry axis; and a vehicle detection unit configured to compare the waveform of pixel outputs in the road surface reflection region with the waveform of pixel outputs in the road surface region and to detect the road surface reflection region as a vehicle when the waveform of pixel outputs in the road surface reflection region has a similar feature to that in the road surface region.

A vehicle detection method according to a second aspect of the present invention includes: generating a radio wave image based on electromagnetic waves received by an antenna; detecting a road surface region from the radio wave image based on the electromagnetic waves received by the antenna; setting a first symmetry axis at a part of a boundary of the road surface region, the part having a horizontal length not less than a predetermined value; setting a horizontal central line at a center of the radio wave image in a vertical direction; setting a road surface reflection region between the central line and the first symmetry axis; and comparing a waveform of pixel outputs in the road surface reflection region with waveform of pixel outputs in the road surface region and detecting the road surface reflection region as a vehicle when the waveform of pixel outputs in the road surface reflection region has a similar feature to that in the road surface region.

A vehicle detection device according to a third aspect includes: an antenna sensing electromagnetic waves radiated from an object; an image generation unit generating a radio wave image based on the electromagnetic waves received by the antenna; and a vehicle detection unit configured to detect an inflection point of pixel outputs from a waveform of pixel outputs generated by scanning the pixel outputs of a radio wave image in a vertical direction of the radio wave image and to detect a vehicle by judging if the waveform of pixel outputs is symmetrical with respect to a second symmetry axis determined by the inflection point.

DESCRIPTION OF EMBODIMENTS

Hereinafter, with reference to the drawings, a description is given of embodiments to which the present invention is applied.

Figure 1:
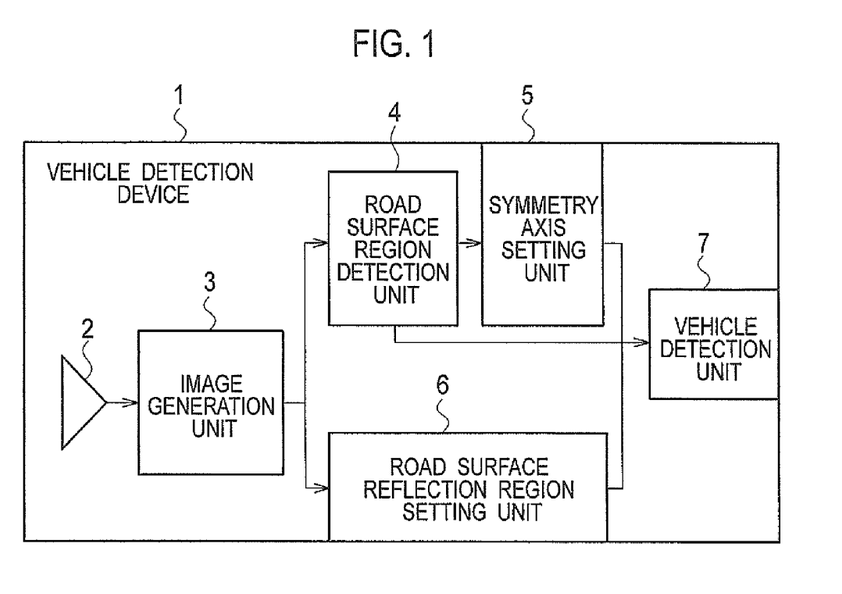
FIG. 1 is a block diagram illustrating a configuration of a vehicle detection device according to a first embodiment to which the present invention is applied.

With reference to FIG. 1, a description is given of the configuration of a vehicle detection device according to a first embodiment. A vehicle detection device 1 according to the first embodiment includes: an antenna 2 sensing electromagnetic waves radiated from objects; an image generation unit 3 generating a radio wave image based on the electromagnetic waves received by the antenna 2; a road surface region detection unit 4 detecting a road surface region in the radio wave image based on the electromagnetic waves received by the antenna 2; a symmetry axis setting unit 5 setting a first symmetry axis on the radio wave image; a road surface reflection region setting unit 6 setting a road surface reflection region on the radio wave image; and a vehicle detection unit 7 comparing a waveform of pixel outputs in the road surface reflection region with a waveform of pixel outputs in the road surface region to detect a vehicle.

Herein, the vehicle detection device 1 according to the first embodiment utilizes a phenomenon in which a metallic vehicle reflects electromagnetic waves radiated from the road to recognize, as the vehicle, a region where the waveform of electromagnetic waves have a similar feature to that of electromagnetic waves radiated from the road surface on the radio wave image. The first embodiment shows a case where the vehicle detection device 1 is installed in a vehicle by way of example, and the description thereof is given of the case of directing the antenna 2 in the direction of forward movement of the device-equipped vehicle and detecting a vehicle existing ahead in the direction of forward movement of the device-equipped vehicle.

The antenna 2 is composed of an array antenna including plural antennas arrayed, a scanning mechanism, and a lens. The antenna 2 is composed of an array antenna including 1 row by 20 columns of elements, for example, and is set so as to detect electromagnetic waves with frequencies of 100 to 300 GHz. The antenna 2 may include plural rows of array antennas to simultaneously obtain a two-dimensional image. In this case, the scanning mechanism can be eliminated.

The image generation unit 3 generates a two-dimensional radio wave image based on an amount of electromagnetic waves received by the antenna 2. The image generation unit 3 may be composed of a radio camera together with the antenna 2.

The road surface region detection unit 4 extracts from a radio wave image a region where the received power of the electromagnetic waves received by the antenna 2 varies within a predetermined value (5%, for example) and detects the extracted region as a road surface region. This utilizes the feature that the received power of electromagnetic waves radiated from a flat object, like a road surface, varies within a certain range. The road surface region may be detected by another method. For example, the road surface region may be detected based on the ratio of horizontally polarized waves to vertically polarized waves which are received by the antenna 2.

The symmetry axis setting unit 5 detects a horizontal part of the boundary of the detected road surface region and sets the detected horizontal part as a first symmetry axis when the horizontal part is not shorter than a predetermined value.

The road surface reflection region setting unit 6 sets a horizontal central line at the center of the radio wave image in the vertical direction and sets the region between the central line and the first symmetry axis as the road surface reflection region.

The vehicle detection unit 7 compares the waveform of pixel outputs in the road surface reflection region with the waveform of pixel outputs in the road surface region and detects the road surface reflection region as a vehicle when the compared waveforms include a similar feature.

(Procedure of Vehicle Detection Process)

Figure 2:
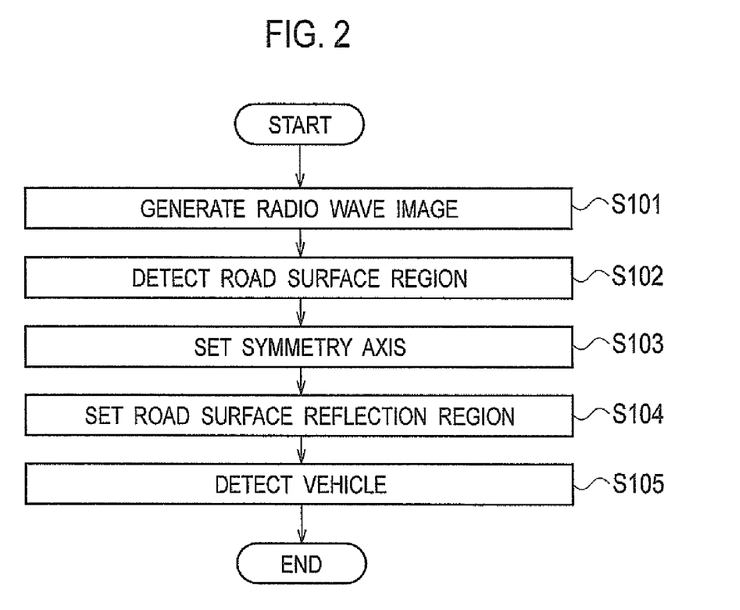
FIG. 2 is a flowchart showing a processing procedure of a vehicle detection process by the vehicle detection device according to the first embodiment.

Next, a description is given of the procedure of the vehicle detection process by the vehicle detection device 1 according to the first embodiment with reference to the flowchart of FIG. 2.

Figure 3:
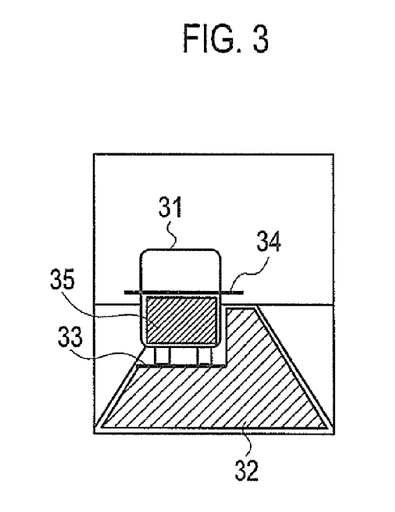
FIG. 3 is a plan view illustrating an example of a radio wave image generated by an image generation unit 3.

In step S 101, the antenna 2 scans to receive electromagnetic waves radiated from the environment around the device-equipped vehicle, and the image generation unit 3 generates a radio wave image. FIG. 3 shows an example of the generated radio wave image. The radio wave image illustrated in FIG. 3 shows an image of a vehicle 31 moving in front of the device-equipped vehicle in the same direction as the device-equipped vehicle is moving.

Next, in step S 102, the road surface region detection unit 4 detects the road surface region from the radio wave image. For example, the region where the received power of the electromagnetic waves received by the antenna 2 varies within a predetermined value (5%) is detected as the road surface region. In the radio wave image illustrated in FIG. 3, a region 32 shown by diagonal lines is detected as the road surface region. However, the method of detecting the road surface region may be another publicly known method and is not limited to the aforementioned method.

Next, in step S 103, the symmetry axis setting unit 5 detects a horizontal part of the boundary of the road surface region other than the horizon and the edge of the image and sets the detected horizontal part as the first symmetry axis when the extracted horizontal part is not shorter than the predetermined value. In the radio wave image illustrated in FIG. 3, a part 33 of the boundary of the road surface region 32 which is in contact with the vehicle 31 extends horizontally. The length of this horizontal part is compared with a previously set predetermined value. When the length of this horizontal part is equal to or more than the predetermined value, the horizontal part is set as the first symmetry axis 33.

Next, in step S 104, the road surface reflection region setting unit 6 sets a horizontal central line at the center of the radio wave image in the vertical direction and sets the road surface reflection region between the central line and the first symmetry axis 33. In the radio wave image illustrated in FIG. 3, the central line 34 is set at the center of the radio wave image, and the part between the central line 34 and the first symmetry axis 33 is set as the road surface reflection region 35. The center of the radio wave image corresponds to the height at which the antenna 2 is placed. Reflection on the road surface affects only part below the central line 34. Accordingly, the central line 34 is set, and the road surface reflection region 35 is set below the central line 34.

It is conceivable that the position of the central line 34 moves in response to the movement of a vehicle when the vehicle detection device 1 is installed in the vehicle. Accordingly, the road surface reflection region setting unit 6 changes the position of the central line 34 in response to the movement of the device-equipped vehicle. For example, when the vehicle vibrates, an angle of vibration which can be predicted is set in advance, and the position of the central line 34 is changed in accordance with the angle of vibration for correcting the shift of the horizontal plane. Furthermore, the position of the central line 34 is corrected in accordance with the acceleration sensed by a sensor when the vehicle is decelerating or accelerating, and the inclination due to rolling is corrected when the vehicle is turning.

Next, in step S 105, the vehicle detection unit 7 detects a vehicle by comparing the waveform of pixel outputs in the road surface reflection region 35 with the waveform of pixel outputs in the road surface region 32.

Figure 4:
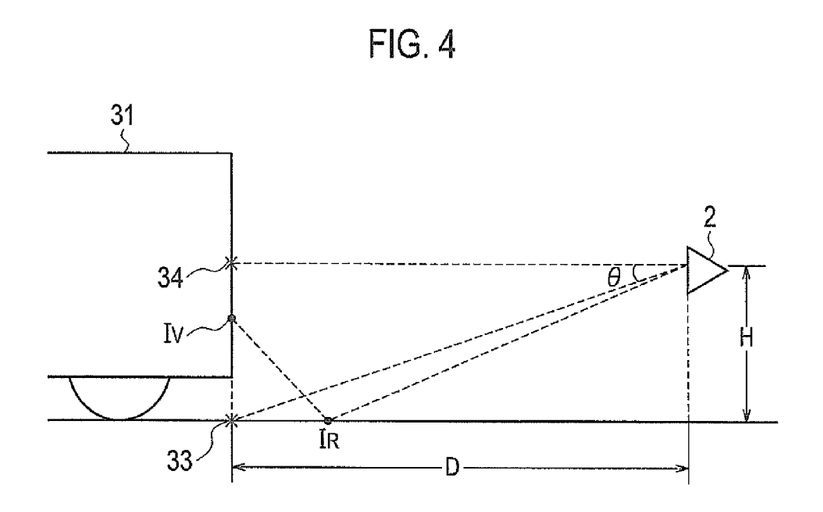
FIG. 4 is a side view illustrating a relationship between a vehicle 31 illustrated in FIG. 3 and a device-equipped vehicle.

Herein, the method of comparing the waveforms of pixel outputs by the vehicle detection unit 7 is described based on FIG. 4. FIG. 4 is a side view showing the relationship between the vehicle 31 illustrated in FIG. 3 and the device-equipped vehicle. As illustrated in FIG. 4, when the antenna 2 is placed at a height H, the central line 34 is at the same height H on the vehicle 31. The first symmetry axis 33 is located at the position of the vehicle 31 on the road surface. Distance D from the antenna 2 is calculated in the following manner.

First, an angle θ can be calculated from the position of the first symmetry axis 33 on the radio wave image, and the distance D can be expressed by Equation (1) using the height H at which the antenna 2 is placed.

$$D = H/\tan\theta \tag{1}$$

The position of a pixel IR in the road surface region 32 corresponding to each pixel IV is calculated by Equation (2). Herein, the pixel IV is a pixel on the radio wave image in the road surface reflection region 35.

$$IR = \arctan[H/\{D - H/\tan(IV*F/E)\}]/F*E \tag{2}$$

Herein, F is a vertical resolution of the radio wave image, and E is a number of pixels of the radio wave image in the vertical direction. The pixel IR obtained from Equation (2) is a pixel located at a position symmetrical to the pixel IV with respect to the first symmetry axis 33. This means that, if the pixel IV is a point on the vehicle and reflects electromagnetic waves from the road surface, the pixel IV reflects the electromagnetic waves radiated from the pixel IR. Accordingly, the positions of pixels IR which are symmetrical to the respective positions of all the pixels in the road surface reflection region 35 with respect to the first symmetry axis 33 are calculated, and the waveforms of pixel outputs are compared for each of the pixels IR.

Figure 5:
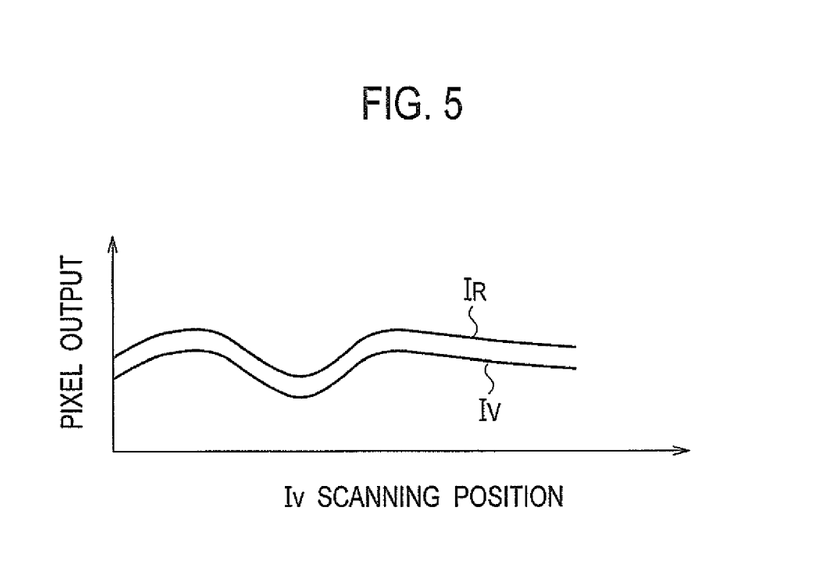
FIG. 5 is a graph showing waveforms of pixel outputs detected by the vehicle detection device according to the first embodiment.

For example, when the pixel output of the pixel IV in the road surface reflection region 35 is calculated and is compared with that of the corresponding pixel IR, the detection result illustrated in FIG. 5 is obtained. FIG. 5 shows a comparison between the waveform of pixel outputs of the pixel IV and the waveform of pixel outputs of the pixel IR as the position of the pixel IV changes. The pixel outputs of the pixels IV represent reflection of electromagnetic waves radiated from the pixels IR and are therefore lower than the pixel outputs of the pixels IR. However, the waveform of the pixel outputs of the pixels IV has a similar profile to that of the pixels IR.

Figure 6:
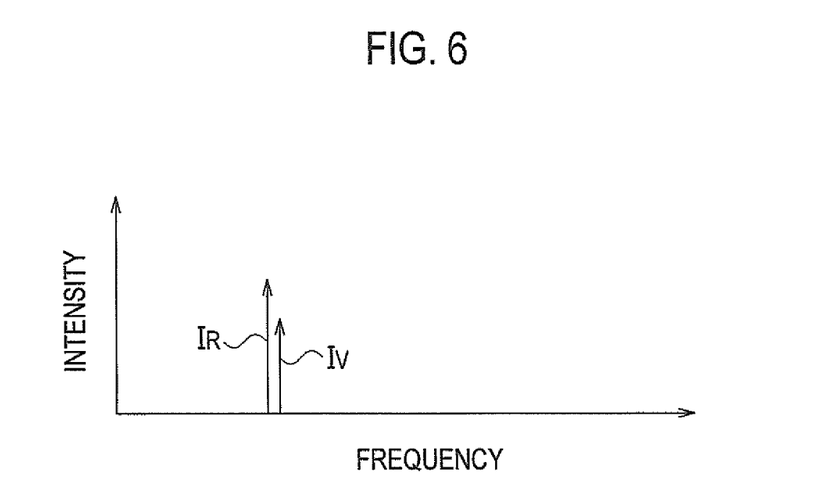
FIG. 6 is a graph showing the result of a frequency analysis for the waveforms of the pixel outputs of FIG. 5.

Furthermore, a frequency analysis on the detection results shown in FIG. 5 provides the results of analysis shown in FIG. 6. FIG. 6 shows the analysis results of the Fourier transform performed as the frequency analysis, in which IV and IR are different in intensity but are the same in frequency range. In this process, the vehicle detection unit 7 determines whether the frequency range between the pixels IV and IR is within a predetermined value, for example, within 10%. When the frequency range is within the predetermined value, the vehicle detection unit 7 determines that the detection results of the road surface reflection region 35 represent reflection of electromagnetic waves radiated from the road surface region 32. The vehicle detection unit 7 thereby determines the road surface reflection region 35 as the vehicle 31, thus detecting the vehicle 31 in the radio wave image.

The above description is about the process for one radio wave image. However, the radio wave image can be obtained as a motion picture. In this case, the vehicle detection device 1 may store pixel outputs at multiple time points and compare the waveforms between the stored pixel outputs. The resolution of the radio wave image is therefore increased, so that the comparison of the waveforms can be performed with a high resolution.

In this case, the vehicle detection unit 7 calculates the distance D to the first symmetry axis 33 by Equation (1) and compares the waveforms of pixel outputs between multiple time points only when the change in the distance D is within a predetermined value, for example, within 10%. The pixel outputs stored at the multiple time points under a condition where the distance D is greatly changing only bring an unstable detection results. Accordingly, the detection of a vehicle is performed by storing pixel outputs at multiple time points only when the distance D is not changing so much.

Alternatively, the waveforms of pixel outputs only in the road surface region 32 are compared between multiple time points, and only when the variation in the compared waveforms is not more than a predetermined value, the comparison of waveforms for vehicle detection is performed. This is because the vehicle cannot be accurately detected even by the vehicle detection when the waveform of pixel outputs in the road surface region 32 greatly varies among multiple time points because of a change in road surface conditions.

Furthermore, the vehicle detection unit 7 may be configured to detect the road surface reflection region 35 as a moving vehicle directly when the distance D to the first symmetry axis 33 changes a predetermined value or more at multiple time points. This is because, judging from the changing distance D, the road surface reflection region 35 can be determined as an object having a relative speed, and the object is determined to be a vehicle.

When a vehicle is detected from the radio wave image by performing the aforementioned process, the vehicle detection process by the vehicle detection device 1 according to the first embodiment is terminated.

As described above in detail, with the vehicle detection device 1 according to the first embodiment, the waveform of pixel outputs in the road surface reflection region is compared with that in the road surface region, and the road surface reflection region is detected as a vehicle when the compared waveforms have similar features. It is therefore possible to accurately detect a vehicle by utilizing a phenomenon in which the metallic vehicle reflects electromagnetic waves from the road surface.

Moreover, with the vehicle detection device 1 according to the first embodiment, the features of waveforms are compared using a frequency analysis. It is therefore possible to compare the features of waveforms independently of the brightness and more accurately detect a vehicle.

Furthermore, with the vehicle detection device 1 according to the first embodiment, the waveforms are compared between the pixel outputs stored at multiple time points. Accordingly, the resolution of the radio wave image is increased, so that the comparison of waveforms can be performed at a higher resolution.

Still furthermore, with the vehicle detection device 1 according to the first embodiment, the waveforms are compared between the pixel outputs at multiple time points when the change in the distance D to the first symmetry axis 33 is within a predetermined value. It is therefore possible to execute detection of a vehicle only under the conditions where the vehicle can be stably detected.

Still furthermore, with the vehicle detection device 1 according to the first embodiment, the waveforms are compared between the pixel outputs at multiple time points in the road surface region 32, and only when the change thereof is not more than the predetermined value, the comparison of waveforms for detecting a vehicle is performed. It is therefore possible to prevent the detection of a vehicle from being unstable because of a change in the road surface conditions.

Moreover, with the vehicle detection device 1 according to the first embodiment, the road surface reflection region 35 is detected as a moving vehicle when the distance D to the first symmetry axis 33 changes a predetermined value or more at multiple time points. It is therefore possible to easily detect a moving vehicle.

Moreover, with the vehicle detection device 1 according to the first embodiment, the position of the central line 34 is changed in response to a movement of the device-equipped vehicle. It is therefore possible to stably detect a vehicle independently of the movement of the device-equipped vehicle.

A vehicle detection device according to a second embodiment detects a vehicle by utilizing a phenomenon in which the metallic vehicle reflects electromagnetic waves radiated from the road surface and by judging the symmetry of the waveform of pixel outputs generated by scanning the pixel outputs in the vertical direction of the radio wave image. As similar to the first embodiment, the second embodiment shows a case where the vehicle detection device is installed in a vehicle by way of example, and the description thereof is given of the case of directing the antenna 2 in the direction of forward movement of the device-equipped vehicle and detecting a vehicle existing ahead in the direction of forward movement of the device-equipped vehicle.

Among the configuration illustrated in FIG. 1, the vehicle detection device 1 according to the second embodiment includes at least: the antenna 2 sensing electromagnetic waves radiated from objects; the image generation unit 3 generating a radio wave image based on the electromagnetic waves received by the antenna 2; and the vehicle detection unit 7. In other words, the vehicle detection device 1 according to the second embodiment does not need to include the road surface region detection unit 4, symmetry axis setting unit 5, and road surface reflection region setting unit 6.

The vehicle detection unit 7 in the second embodiment is configured to detect a vehicle by detecting an inflection point of pixel outputs from the waveform of pixel outputs generated by scanning the pixel outputs of the radio wave image in the vertical direction of the radio wave image and determining the symmetry of the waveform of pixel outputs with respect to a second symmetry axis determined by the detected inflection point.

The antenna 2 and image generation unit 3 are the same as those of the first embodiment, and the description thereof is omitted.

(Operation of Vehicle Detection Device)

Next, a description is given of the operation of the vehicle detection device according to the second embodiment.

First, the antenna 2 scans to receive electromagnetic waves radiated from the environment around the device-equipped vehicle, and the image generation unit 3 generates a radio wave image. An example of the generated radio wave image is shown in FIG. 7(a). The radio wave image illustrated in FIG. 7(a) shows a vehicle 31 moving in front of the device-equipped vehicle in the same direction as the device-equipped vehicle is moving.

The vehicle detection unit 7 scans pixel outputs of the radio wave image in the vertical direction of the radio wave image to generate a waveform of pixel outputs. To be specific, as illustrated in FIG. 7(a), pixel outputs of the radio wave image are continuously outputted along each of plural scanning axes Ax1, Ax2, and Ax3 on the radio wave image to generate pixel output waveforms PAx1, PAx2, and PAx3 illustrated in FIG. 7(b). The horizontal axis of FIG. 7(b) represents the pixel outputs, and the vertical axis thereof represents scanning positions on the scanning axes Ax1, Ax2, and Ax3. The pixel output waveform PAx1 is a waveform along the scanning axis Ax1; the pixel output waveform PAx2 is a waveform along the scanning axis Ax2; and the pixel output waveform PAx3 is a waveform along the scanning axis Ax3.

Figure 7:
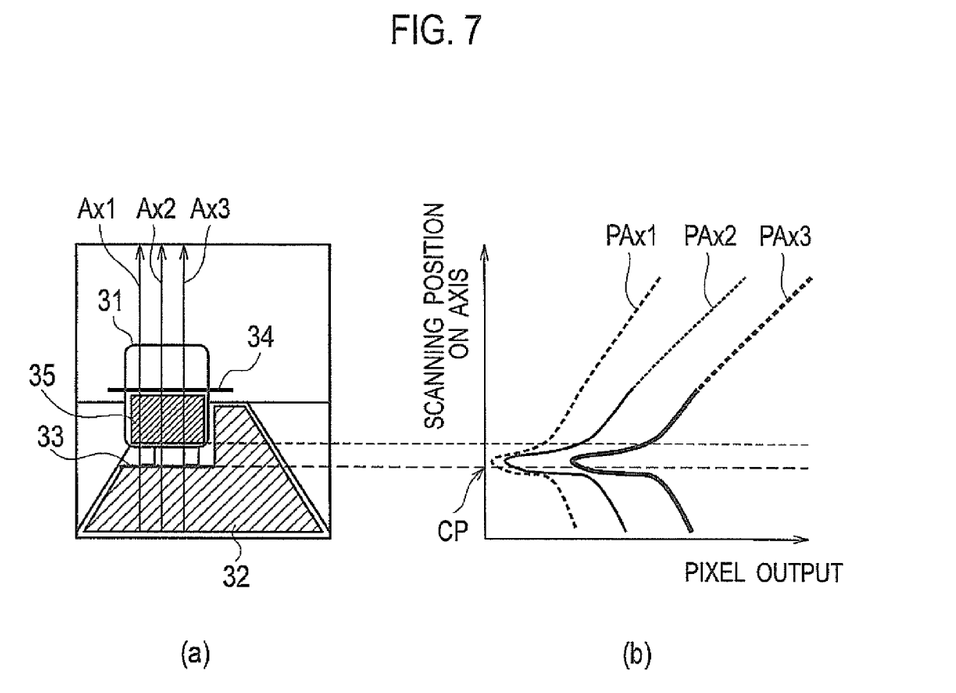
FIG. 7 is a view for explaining the operation of a vehicle detection device according to a second embodiment to which the present invention is applied, FIG. 7(a) being a plan view illustrating scanning axes on a radio wave image, FIG. 7(b) being a graph illustrating the relationship between the pixel outputs and the scanning positions on the aforementioned scanning axis.

The vehicle detection unit 7 detects an inflection point CP of pixel outputs from the pixel output waveforms PAx1, PAx2, and PAx3 illustrated in FIG. 7 (b). The vehicle detection unit 7 detects, as the inflection point CP of pixel outputs, the scanning positions on the scanning axes Ax1 to Ax3 at which the pixel outputs take the local maximum or minimum values, for example. The vehicle detection unit 7 may detect an inflection point for each of the pixel output waveforms PAx1, PAx2, and PAx3 as the inflection point CP or calculate the average of the detected inflection points of the pixel output waveforms PAx1, PAx2, and PAx3 as the inflection point CP.

The vehicle detection unit 7 detects a vehicle by judging the symmetry of each of the pixel output waveforms PAx1, PAx2, and PAx3 with respect to the second symmetry axis determined by the detected inflection point CP. The vehicle detection unit 7 judges whether each of the pixel output waveforms PAx1, PAx2, and PAx3 is symmetrical with respect to the second symmetry axis which is a line passing through the inflection point CP, for example. When the pixel output waveforms PAx1, PAx2, and PAx3 are symmetrical, it is determined that the vehicle is on the scanning axes Ax1 to Ax3.

When the pixel output waveforms PAx1, PAx2, and PAx3 are symmetrical, the second symmetry axis corresponds to the first symmetry axis 33 illustrated in FIG. 7(a). This is because the pixel IR calculated from Equation (2) (see FIG. 4) is a pixel at the position symmetrical to the pixel IV with respect to the first symmetry axis 33 and the pixel IV reflects electromagnetic waves radiated from the pixel IR. Accordingly, when the pixel output waveforms PAx1, PAx2, and PAx3 are symmetrical with respect to the inflection point CP, it is determined that the first symmetry axis 33 is located at the inflection point CP on the scanning axis Ax1 to Ax3. It is therefore determined that the vehicle 31 is located on the scanning axes Ax1 to Ax3. To be specific, it is determined that the vehicle 31 is located above the inflection point CP on the scanning axes Ax1 to Ax3. To be more specific, when the vehicle detection device according to the second embodiment sets the central line 34, it is determined that the vehicle 31 is located between the central line 34 and the inflection point CP on the scanning axes Ax 1 to Ax3.

In a similar manner to the first embodiment, pixel outputs at multiple time points may be stored for comparison of waveforms. In this process, pixel outputs at multiple time points may be stored for detection of a vehicle only when the distance D is not changing so much.

Moreover, in the case where the vehicle detection device according to the second embodiment includes the road surface region detection unit 4, the waveforms of pixel outputs only in the road surface region 32 are compared between multiple time points, and only when the variation in the compared waveforms is not more than a predetermined value, the comparison of waveforms for vehicle detection is performed.

As described above in detail, with the vehicle detection device according to the second embodiment, the inflection point CP is detected from the pixel output waveforms PAx1 to PAx3 which are obtained by scanning the radio wave image in the vertical direction, and the symmetry of the pixel output waveforms PAx1 to PAx3 with respect to the inflection points CP as the second symmetry axis is determined, thus detecting the vehicle 31. It is therefore possible to accurately detect a vehicle by utilizing a phenomenon in which the metallic vehicle reflects electromagnetic waves from the road surface.

Hereinabove, the contents of the present invention are described with the first and second embodiments, but the present invention is not limited to the description thereof. It is obvious to those skilled in the art that the present invention can be variously changed and improved.

With the vehicle detection device and the vehicle detection method according to the embodiments, the waveform of pixel outputs in the road surface reflection region is compared with that in the road surface region, and when the waveforms have a similar feature, the road surface reflection region is detected as a vehicle. Alternatively, a vehicle is detected by detecting an inflection point from the waveform obtained by vertical scanning and determining the symmetry of the waveform of pixel outputs with respect to the second symmetry axis determined by the detected inflection point. It is thus possible to accurately detect a vehicle by utilizing a phenomenon in which the metallic vehicle reflects electromagnetic waves from the road surface. The present invention therefore includes an industrial applicability.

The invention claimed is:

1. A vehicle detection device, comprising:
   an antenna configured to sense electromagnetic waves radiated from an object;
   an image generation unit configured to generate a radio wave image based on the electromagnetic waves received by the antenna;
   a road surface region detection unit configured to detect a road surface region in the radio wave image based on the electromagnetic waves received by the antenna;
   a symmetry axis setting unit configured to set a first symmetry axis at a part of a boundary of the road surface region, the part having a horizontal length not less than a predetermined value;
   a road surface reflection region setting unit configured to set a horizontal central line at a center of the radio wave image in a vertical direction and set a road surface reflection region between the central line and the first symmetry axis; and
   a vehicle detection unit configured to compare a waveform of pixel outputs in the road surface reflection region with a waveform of pixel outputs in the road surface region and to detect the road surface reflection region as a vehicle when the waveform of pixel outputs in the road surface reflection region has a similar feature to that in the road surface region.

2. The vehicle detection device according to claim 1, wherein the vehicle detection unit compares the features between the waveforms using a frequency analysis.

3. The vehicle detection device according to claim 1, wherein the vehicle detection unit stores pixel outputs at a plurality of time points to compare the waveforms of the stored pixel outputs.

4. The vehicle detection device according to claim 3, wherein the vehicle detection unit calculates a distance to the first symmetry axis based on a height at which the antenna is placed and the position of the first symmetry axis on the radio wave image and compares the waveforms of pixel outputs at the plurality of time points when a change in the distance to the first symmetry axis is within a predetermined value.

5. The vehicle detection device according to claim 3, wherein the vehicle detection unit compares the waveforms of pixel outputs in the road surface region between a plurality of time points and, when a change in the waveforms of the pixel outputs is not more than a predetermined value, compares the waveform of pixel outputs in the road surface reflection region with the waveform of pixel outputs in the road surface region.

6. The vehicle detection device according to claim 4, wherein the vehicle detection unit detects the road surface reflection region as a moving vehicle when the distance to the first symmetry axis changes by a predetermined value or more at a plurality of time points.

7. The vehicle detection device according to claim 1, wherein when the vehicle detection device is installed in a vehicle, the road surface reflection region setting unit changes the position of the central line in response to a movement of the vehicle in which the vehicle detection device is installed.

8. A vehicle detection method, comprising:
   generating a radio wave image based on electromagnetic waves received by an antenna;
   detecting a road surface region in the radio wave image based on the electromagnetic waves received by the antenna;
   setting a first symmetry axis at a part of a boundary of the road surface region, the part having a horizontal length not less than a predetermined value;
   setting a horizontal central line at a center of the radio wave image in a vertical direction;
   setting a road surface reflection region between the central line and the first symmetry axis; and
   comparing a waveform of pixel outputs in the road surface reflection region with a waveform of pixel outputs in the road surface region and detecting the road surface reflection region as a vehicle when the waveform of pixel outputs in the road surface reflection region has a similar feature to that in the road surface region.

9. A vehicle detection device, comprising:
   an antenna configured to sense electromagnetic waves radiated from an object;
   an image generation unit configured to generate a radio wave image based on the electromagnetic waves received by the antenna; and
   a vehicle detection unit configured to detect an inflection point of pixel outputs from a waveform of pixel outputs generated by scanning the pixel outputs of a radio wave image in a vertical direction of the radio wave image, and detect a vehicle by judging if the waveform of pixel outputs is symmetrical with respect to a second symmetry axis determined by the inflection point,
   wherein the vehicle detection unit determines that the vehicle is located above the inflection point on a scanning axis, when the waveform of pixel outputs is symmetrical with respect to the inflection point.

10. A vehicle detection device, comprising:
   an antenna configured to sense electromagnetic waves radiated from an object;
   an image generation unit configured to generate a radio wave image based on the electromagnetic waves received by the antenna; and
   a vehicle detection unit configured to detect an inflection point of pixel outputs from a waveform of pixel outputs generated by scanning the pixel outputs of a radio wave image in a vertical direction of the radio wave image, and detect a vehicle by judging if the waveform of pixel outputs is symmetrical with respect to a second symmetry axis determined by the inflection point,
   wherein the vehicle detection unit sets a horizontal central line at a center of the radio wave image in the vertical direction and determines that the vehicle is located between the central line and the inflection point on a scanning axis when the waveform of pixel outputs is symmetrical with respect to the inflection point.

* * * * *